United States Patent
Tian

(10) Patent No.: US 10,486,998 B2
(45) Date of Patent: Nov. 26, 2019

(54) ENERGY-SAVING PLATE AND METHOD FOR MANUFACTURING THE SAME

(71) Applicant: Icesun Vacuum Glass Ltd., Montague (CA)

(72) Inventor: Yongjiang Tian, Montague (CA)

(73) Assignee: ICESUN VACUUM GLASS LTD., Montague, PE (CA)

( * ) Notice: Subject to any disclaimer, the term of this patent is extended or adjusted under 35 U.S.C. 154(b) by 158 days.

(21) Appl. No.: 15/522,882

(22) PCT Filed: Nov. 7, 2014

(86) PCT No.: PCT/CN2014/090651
§ 371 (c)(1),
(2) Date: Apr. 28, 2017

(87) PCT Pub. No.: WO2016/065665
PCT Pub. Date: May 6, 2016

(65) Prior Publication Data
US 2017/0313616 A1    Nov. 2, 2017

(30) Foreign Application Priority Data

Oct. 31, 2014   (CN) .......................... 2014 1 0601986
Oct. 31, 2014   (CN) ..................... 2014 2 0643067 U

(51) Int. Cl.
*E06B 3/66*        (2006.01)
*C03B 23/203*      (2006.01)
(Continued)

(52) U.S. Cl.
CPC ............ *C03B 23/203* (2013.01); *C03B 23/24* (2013.01); *C03C 27/00* (2013.01); *C03C 27/06* (2013.01);
(Continued)

(58) Field of Classification Search
CPC ......... Y02B 80/24; E06B 3/6612; E06B 3/66; E06B 3/66366; B32B 17/10055; Y02A 30/25
See application file for complete search history.

(56) References Cited

U.S. PATENT DOCUMENTS 5,005,557 A  *  4/1991  Bachli ..................... C03C 17/09
                                                   126/572
5,156,894 A  *  10/1992  Hood ........................ E04O 2/54
                                                   156/109
(Continued)

FOREIGN PATENT DOCUMENTS

CN          2740605 Y     11/2005
CN        101597133 A     12/2009
(Continued)

OTHER PUBLICATIONS

Machine translation of CN 201896127 (Year: 2011).*
(Continued)

*Primary Examiner* — Donald J Loney

(57) ABSTRACT

The present invention provides an energy-saving plate and a method for manufacturing the same. The energy-saving plate of the present invention includes: at least one upper plate, at least one lower plate, at least one inner plate, and a plurality of support structures; a top edge of the upper plate and a bottom edge of the lower plate appear as a straight line; the inner plate is provided between the upper plate and the lower plate, and adjacent plates are separated by the plurality of support structures; an exhausting opening is provided at a lateral side of the inner plate, which is a through-groove inter-penetrating upper and lower surfaces of the inner plate; the periphery of the upper plate, the lower plate, and the inner plate are sealed via a sealing material, so as to form vacuum layers between the plate layers; an exhausting pipe is arranged in the exhausting opening, with which the (Continued)

exhausting opening is sealed together via the sealing material, an open-end of the exhausting pipe is located inside the exhausting opening, and a closed-end of the exhausting pipe is located outside the exhausting opening and is located in the space formed between the upper plate and the lower plate. In the present invention, a total flat surface of the energy-saving plate is achieved without structure defects, thus enhancing the strength of the energy-saving plate.

12 Claims, 4 Drawing Sheets

(51) Int. Cl.
    *C03C 27/00*     (2006.01)
    *C03C 27/06*     (2006.01)
    *C03B 23/24*     (2006.01)
    *E06B 3/673*     (2006.01)
    *E06B 3/663*     (2006.01)
    *B32B 17/10*     (2006.01)

(52) U.S. Cl.
    CPC .............. *E06B 3/66* (2013.01); *E06B 3/6612* (2013.01); *E06B 3/673* (2013.01); *B32B 17/10055* (2013.01); *E06B 3/66366* (2013.01); *Y02A 30/25* (2018.01); *Y02B 80/24* (2013.01)

(56) References Cited

U.S. PATENT DOCUMENTS

| | | | | |
|---|---|---|---|---|
| 5,270,084 A | * | 12/1993 | Parker | ..................... C03C 27/06 |
| | | | | 428/34 |
| 5,544,465 A | * | 8/1996 | Hood | ........................ E04O 2/54 |
| | | | | 52/786.11 |
| 2014/0290156 A1 | * | 10/2014 | Bruce | ..................... E06B 3/677 |
| | | | | 52/171.3 |

FOREIGN PATENT DOCUMENTS

| | | |
|---|---|---|
| CN | 201896127 U | 7/2011 |
| CN | 203174844 U | 9/2013 |
| CN | 103420577 A | 12/2013 |
| DE | 1285123 B | 12/1968 |
| EP | 0645516 A2 | 3/1995 |

OTHER PUBLICATIONS

International Search Report dated Aug. 5, 2015 in PCT/CN2014/090651 (with English translation).

Written Opinion dated Aug. 5, 2015 in PCT/CN2014/090651 (with English translation).

International Preliminary Report on Patentability (IPRP) dated May 2, 2017 in PCT/CN2014/090651 (with English translation).

\* cited by examiner

ENERGY-SAVING PLATE AND METHOD FOR MANUFACTURING THE SAME

CROSS-REFERENCE TO RELATED APPLICATIONS

This application is a national filing of PCT Application No. PCT/CN2014/090651, filed on Nov. 7, 2014, entitled "ENERGY-SAVING SHEET AND MANUFACTURING METHOD THEREFOR", which claims priority and the benefits of Chinese patent application nos. CN201410601986.8 and CN201420643067.2, both filed Oct. 31, 2014.

FIELD OF THE INVENTION

The present invention relates to the field of energy-saving plate, and in particular, to an energy-saving plate and a method for manufacturing the same.

BACKGROUND OF THE INVENTION

Energy-saving plate can be used in the field of doors and windows of buildings, which is an excellent heat insulation and sound insulation material. In the prior art, two plates of glass are separated with appropriate support structures, and bonded at the periphery with agglutinant. Gas molecules within the inner chamber are extracted via a glass exhausting pipe by means of a vacuum pump, and getter materials are placed in the chamber, thereby keeping the inner vacuum pressure within a range of about $10^{-2}$ to $10^{-7}$ torr. Then, the glass exhausting pipe is melted and cut off so as to form air-tight sealing.

In the prior art, a manner of local heating is used to melt the glass exhausting pipe and cut it off for sealing. Since the temperature for melting the glass is so high that the position of melting the glass exhausting pipe cannot be close to the plate glass too much, in the sake of avoiding the plate glass from cracking because of uneven heating. Thus, the glass exhausting pipe remains a short length at the outside of the plate glass, after being melted and cut off. In order to avoid the aforesaid defect, an accommodating recess is provided on the plate glass for placing the exhausting pipe. However, the accommodating recess on the plate glass weakens the strength of a flat vacuum glass, and is easy to cause potential structure risk.

SUMMARY OF THE INVENTION

An energy-saving plate and a method for manufacturing the same are provided in present invention, to overcome the shortcoming of the prior art.

The present invention provides an energy-saving plate, including: at least one upper plate, at least one lower plate, at least one inner plate, and a plurality of support structures;

a top edge of the upper plate and a bottom edge of the lower plate appear as a straight line;

the inner plate is provided between the upper plate and the lower plate, and adjacent plates are separated by the plurality of support structures;

an exhausting opening is provided at a lateral side of the inner plate, which is a through-groove inter-penetrating upper and lower surfaces of the inner plate;

the periphery of the upper plate, the lower plate, and the inner plate are sealed via a sealing material, so as to form vacuum layers between the plate layers;

an exhausting pipe is arranged in the exhausting opening, with which the exhausting opening is sealed together via the sealing material, an open-end of the exhausting pipe is located inside the exhausting opening, and a closed-end of the exhausting pipe is located outside the exhausting opening and is located in the space formed between the upper plate and the lower plate.

The present invention provides a method for manufacturing an energy-saving plate, including:

placing a plurality of support structures on a lower plate, arranging a sealing material at an upper surface periphery of the lower plate. A lower periphery of the lower plate appears as a straight line;

covering the lower plate with an inner plate, which is provided with an exhausting opening, to form a first chamber. The exhausting opening is a through-groove inter-penetrating upper and lower surfaces of the inner plate;

providing the exhausting pipe in the exhausting opening;

placing a plurality of support structures on the inner plate, which are arranged alternatively to the support structures under the inner plate, and placing the sealing material on the upper surface periphery of the inner plate;

covering the inner plate with the upper plate, to form a second chamber. The upper periphery of the upper plate appears as a straight line, and a closed-end of the exhausting opening is located in the space formed between the upper plate and the lower plate;

melting the sealing material via a temperature of equal to or less than 500° C., so as to seal the periphery of the upper, lower and inner plate together;

vacuumizing the space between each two plates via the exhausting pipe, so as to keep the vacuum level within a range of 10 Pa to $10^{-6}$ Pa;

winding a heating coil around the outside of the exhausting pipe, while locally heating the exhausting pipe by supplying electricity, cooling the bottom of the exhausting pipe with high pressure cold air.

In the energy-saving plate and the method for manufacturing the same, through using at least one upper plate, at least one lower plate, and at least one inner plate to form the energy-saving plate. Providing an exhausting opening at a lateral side of the inner plate, which exhausting opening is a through-groove inter-penetrating upper and lower surfaces of the inner plate. That is, forming a "凹" shaped through-groove at the lateral side of the inner plate. Furthermore, arranging the exhausting pipe in the exhausting opening, enables the open-end of the exhausting pipe to connect to the vacuum layer through the through-groove. The vacuum layer is vacuumized via the exhausting pipe, enables the vacuum level keep within a range of 10 Pa to $10^{-6}$ Pa. A heating coil is winded around the outside of the exhausting pipe, while locally heating the exhausting pipe by supplying electricity, cooling the bottom of the exhausting pipe with high pressure cold air, thus the exhausting pipe is sealed, enables the closed-end of the exhausting pipe to locate outside of the exhausting opening and locate in the space formed between the upper plate and the lower plate of the energy-saving plate. Thus, the lateral edge of the upper plate and the lower plate can be an integral straight line, and the closed-end of the exhausting pipe is located in the interior of the periphery of the energy-saving plate. It is not needed to provide an accommodating recess on the upper plate and the lower plate, for receiving the exhausting pipe, it is not needed to provide a metal protecting lid for covering the exhausting pipe, and it is not needed to worry about the problem of cracking of the exhausting pipe. In addition, a total flat surface of the energy-saving plate is achieved without structure defects, thus enhancing the strength of the energy-saving plate.

BRIEF DESCRIPTION OF THE DRAWINGS

To illustrate the technical solutions of embodiments of the present invention more clearly, the accompanying drawings required for describing the embodiments are introduced below briefly. Apparently, the accompanying drawings in the following descriptions are only some embodiments of the present invention, persons of ordinary skill in the art can obtain other drawings according to these accompanying drawings without creative efforts.

DETAILED DESCRIPTION OF THE EMBODIMENTS

In order to make the objective, technical solutions and advantages of embodiments of the present invention more clearly, the technical solutions of the embodiments of the present invention will be described more clearly and completely in combination with the accompany drawings of the embodiments of the present invention. Obviously, the embodiments described are part of the embodiments of the present invention but not all of the embodiments. Based on the embodiments of the present invention, all other embodiments obtained by those skilled in the art without creative work are within the protection scope of the present invention.

Figure 1:
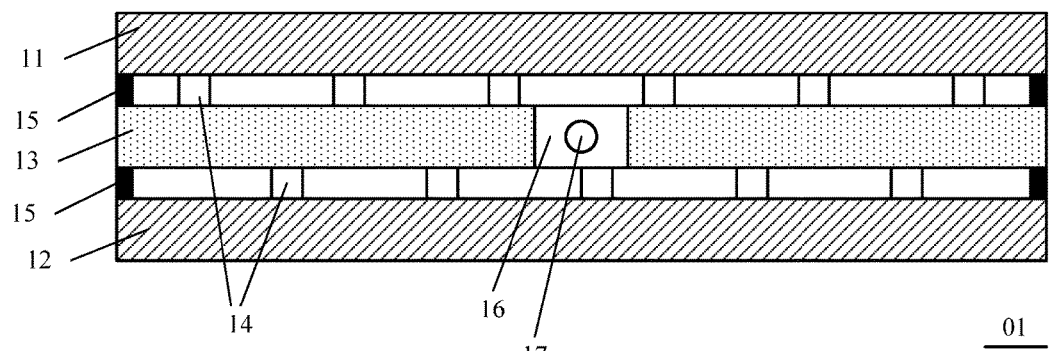
FIG. 1 is a front view of an energy-saving plate according to Embodiment 1 of the present invention.
Figure 2:
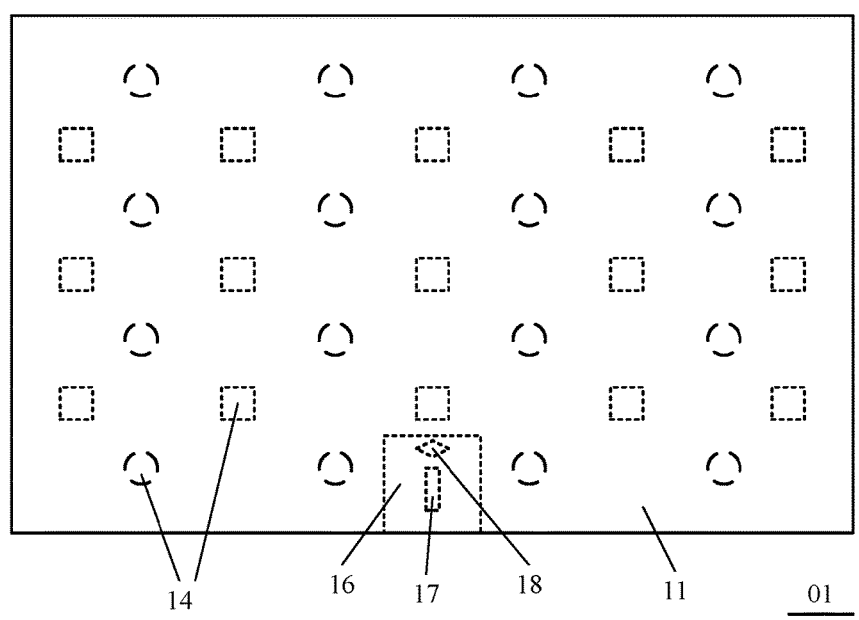
FIG. 2 is a top view of the energy-saving plate according to Embodiment 1 of the present invention.

FIG. 1 is a front view of an energy-saving plate according to Embodiment 1 of the present invention, and FIG. 2 is a top view of the energy-saving plate according to Embodiment 1 of the present invention. As shown in FIG. 1 and FIG. 2, the energy-saving plate 01 of present embodiment can include: at least one upper plate 11, at least one lower plate 12, at least one inner plate 13, and a plurality of support structures 14. A top edge of the upper plate 11 and a bottom edge of the lower plate 13 appear as a straight line. The inner plate 13 is provided between the upper plate 11 and the lower plate 12, and adjacent plates are separated by a plurality of support structures 14. A lateral side of the inner plate 13 is provided with an exhausting opening 16, which is a through-groove inter-penetrating the upper and lower surface of the inner plate 13. The peripheries of the upper plate 11, the lower plate 12, and the inner plate 13 are sealed via sealing material 15, so as to form vacuum layers between the plate layers. An exhausting pipe 17 is arranged in the exhausting opening 16, the exhausting opening and the exhausting pipe are sealed together via the sealing material. An open-end of the exhausting pipe 17 is located inside the exhausting opening 16, and a closed-end of the exhausting pipe 17 is located outside the exhausting opening 16 and is accommodated in the spacing formed between the upper plate 11 and the lower plate 12.

In addition, the getter 18 is put in the interior of the exhausting opening 16.

The present embodiment provides an energy-saving plate, which includes at least one upper plate, at least one lower plate, at least one inner plate. The adjacent plates are separated by a plurality of support structures, and the periphery of the energy-saving plate is sealed via the sealing material, so as to form a vacuum layer between the plates. A lateral side of the inner plate is provided with an exhausting opening, which is a through-groove inter-penetrating the upper and lower surface of the inner plate, that is, a "凹" shaped through-groove is formed at the lateral side of the inner plate, thus solve problems including: difficult machining of half groove on the plate, and easy cracking of the plate. Furthermore, an exhausting pipe is arranged in the exhausting opening, which enables the open-end of the exhausting pipe be connected to the vacuum layer through the through-groove. The vacuum layer is vacuumized via the exhausting pipe, which enables the vacuum level keep within a range of 10 Pa to $10^{-6}$ Pa. A heating coil is winded around the outside of the exhausting pipe, while locally heating the exhausting pipe by supplying electricity, cooling the bottom of the exhausting pipe with high pressure cold air, thus the exhausting pipe is sealed, which enables the closed-end of the exhausting pipe to locate in the space formed between the upper plate and the lower plate of the energy-saving plate. Thus, the lateral edge of the upper plate and the lower plate can be an integral straight line, and the closed-end of the exhausting pipe is located at the interior of the periphery of the energy-saving plate. It is not needed to provide an accommodating access on the upper plate and the lower plate for receiving the exhausting pipe, it is not needed to provide a metal protecting lid for covering the exhausting pipe, and it is not needed to worry about the problem of cracking of the exhausting pipe. In addition, a total flat surface of the energy-saving plate is achieved without structure defects, thus enhancing the strength of the energy-saving plate.

Furthermore, the upper plate 11 and the lower plate 12 are integral uneven rigid plates, and the inner plate 13 is uneven flexible plate, with flatness larger than 10 nm/m.

Figure 3:
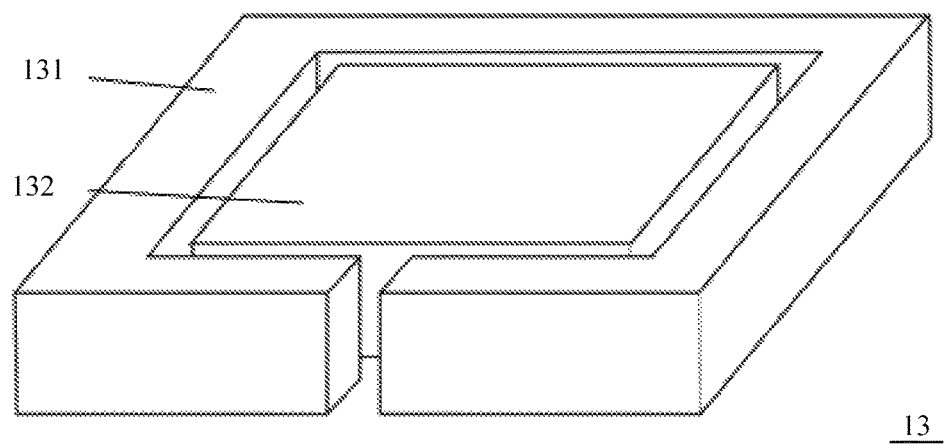
FIG. 3 is a schematic structural view of a first embodiment of an inner plate of the energy-saving plate of the present invention.

FIG. 3 is a schematic structural view of a first embodiment of an inner plate of the energy-saving plate of the present invention. As shown in FIG. 3, the inner plate 13 can be formed by a frame 131 and a central plate 132 separately. The frame 131 is arranged to surround the periphery of the central plate 132. Thus, the inner plate 13 deforms more freely.

Under static load, the inner plate 13 has a poorer anti-deformation capacity than the upper plate 11 and the lower plate 12. After being exerted a force, the deformation of the inner plate 13 is less than the height of the support structures 14, and larger than the unevenness of the upper plate 11 and the lower plate 12, which plates are within the range of the adjacent support structures on the plane. In addition, through using plates with an unevenness of larger than 10 nm/m, selection of material source of the energy-saving plate is expanded, which facilitates manufacture organization. Since uneven flexible plates are used as the inner plate 13, the surface of the inner plate 13 will not be corrupted under the interior vacuum surrounding, tiny cracks will never expand even if exist on the surface of the inner plate 13, so as to fully reflect the properties of flexible plates, and guarantee the strength of the energy-saving plates.

A plurality of support structures 14 are provided, perpendicular to the adjacent plate layer. The support structures 14 between the upper plate 11 and the inner plate 13, and the support structures 14 between the inner plate 13 and the lower plate 12, are not located in an identical perpendicular line, and are arranged alternatively.

In such arrangement, there is only one support structure 14 on the top and bottom side of each support position of the inner plate 13. Under the atmospheric pressure and an external force, when the upper plate 11 and the lower plate 12 transmit force from the support structures 14 to the inner plate 13, the inner plate 13 deforms, as well as distributes the force to the nearest four adjacent support structures 14 at the opposite side of the inner plate 13, so as to compress these five support structures 14 more tightly. In a similar manner, each support structure 14 is compacted between plates because of the deformation of the inner plate 13, so as to solve the problem that, the height of the support structures is smaller than the gap between the adjacent plates, as a result of the unevenness superposition of the upper plate 11 and the lower plate 12. Besides, since the support structures 14 between plates are not located in identical perpendicular line, and are arranged alternatively, the heat conducting distance between plates through the support structures 14, has been extended significantly, and the energy saving effort has been enhanced further. Thus, the problem that the surface of the support structures position likely suffers moisture condensation during usage of the energy-saving plate 01, has been solved.

The material of the upper plate 11, the lower plate 12, and the inner plate 13 can be non-toughened glass, or toughened glass, or semi-toughened glass, or low emissivity glass, or chemically strengthen glass, or heat-reflecting glass, or wired glass, or patterned glass, or hot-melt glass, or coated glass, or color glazed glass, or frosted glass, or carving glass, or chemical etching glass, or solar glass, or fire-resistant glass, or soda-lime glass, or borosilicate glass, or aluminum silicate glass, or silica glass, or porcelain glass, or organic glass, or porcelain plate, or metal plate, or solar cell panel, or plastic plate, or resin plate, or PE plate, or PC plate, or PMMA plate, or PET plate, or polyamide plate, or composite board, or the combination of at least two or more of above material.

Pure metal films, or various pure non-metal films, or various oxide films, or various Nitride film, or the combination of at least two or more of above material can be coated on the surface of the upper plate 11 and the lower plate 12.

Figure 4:
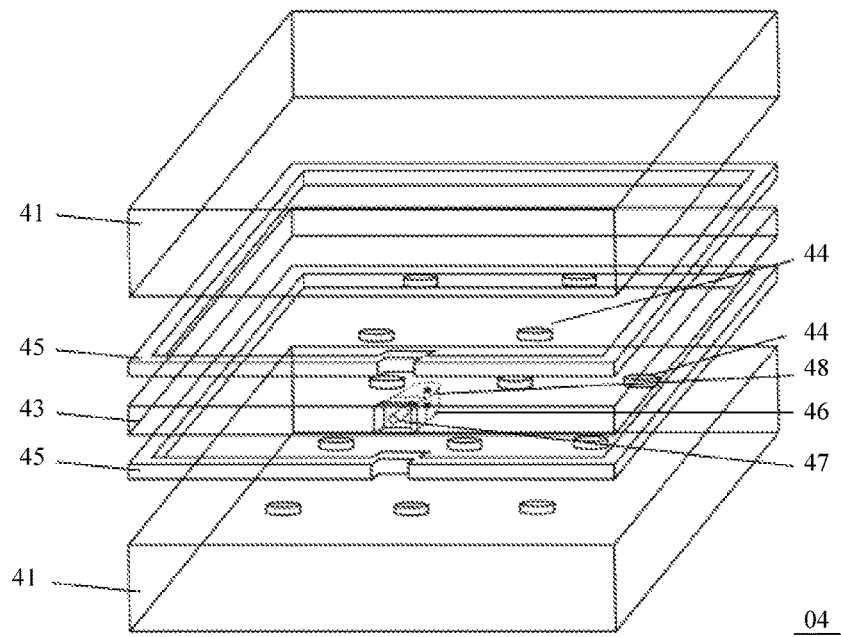
FIG. 4 is a schematic structural view of an energy-saving plate according to Embodiment 2 of the present invention.

FIG. 4 is a schematic structural view of the energy-saving plate according to Embodiment 2 of the present invention. As shown in FIG. 4, regarding as a variable structure of the embodiment shown in FIG. 1, the energy-saving plate 04 of the present embodiment consists of three plate layers. The upper plate and the lower plate at the outermost layer is a Glaverbel flat glass 41 with a thickness of 6 mm. The lateral edges of the two Glaverbel flat glasses 41 appear as an integral straight line. The inner plate is an expansive alloy plate 43 with a thickness of 2 mm.

A plurality of support structures 44 are placed, in sequence, on the Glaverbel flat glass 41, with a thickness of 6 mm, of the outermost lower layer, and on the expansive alloy plate 43, with a thickness of 2 mm, of the inner layer. A plurality of support structures 44 are arranged perpendicularly between the Glaverbel flat glass 41 with a thickness of 6 mm, of the outermost lower layer, and the expansive alloy plate 43 with a thickness of 2 mm, in the inner layer, and are arranged perpendicularly between the expansive alloy plate 43 with a thickness of 2 mm, in the inner layer, and the Glaverbel flat glass 41, with a thickness of 6 mm, of the outermost upper layer, and are arranged alternatively in a direction perpendicular to the plate, which direction does not appear as an identical straight line. The lateral side of the inner expansive alloy plate 43 with a thickness of 2 mm is provided with an exhausting opening 46, which is a through-groove inter-penetrating the upper and lower surface of the inner expansive alloy plate 43 with a thickness of 2 mm. The exhausting opening 46 is arranged with an exhausting pipe 47, and the getter 48 is put in the exhausting opening 46, enabling the exhausting pipe 47 and the getter 48 to connect to the space between the plates.

A sealing material 45 is placed on the upper surface periphery of the Glaverbel flat glass 41, with a thickness of 6 mm, of the outermost lower layer, and on the upper surface periphery of the inner expansive alloy plate 43 with a thickness of 2 mm. The Glaverbel flat glass 41, with a thickness of 6 mm, of the outermost upper layer, is covered on, and the sealing material 45 is melted at a temperature of equal to or less than 500° C., so as to seal these three layer plates together. The space between plates is vacuumized via the exhausting pipe 47, enables the vacuum level keep within a range of 10 Pa to $10^{-6}$ Pa. A heating coil is winded around the outside of the exhausting pipe 47, while locally heating the exhausting pipe 47 by supplying electricity, cooling the bottom of the exhausting pipe 47 with high pressure cold air, thus the exhausting pipe 47 is sealed, enables the closed-end of the exhausting pipe to locate in the space formed between the Glaverbel flat glass 41, with a thickness of 6 mm, of the outermost lower layer, and the Glaverbel flat glass 41, with a thickness of 6 mm, of the outermost upper layer. Thus, the energy-saving plate 04 is formed.

Figure 5:
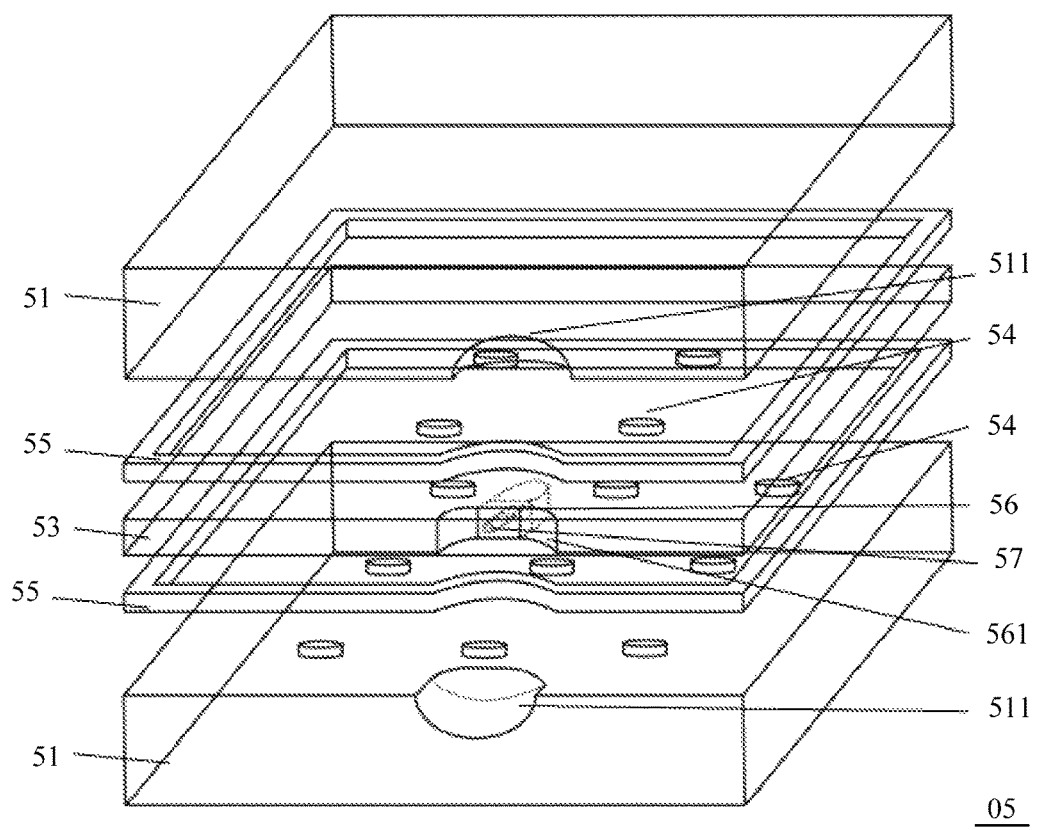
FIG. 5 is a schematic structural view of an energy-saving plate according to Embodiment 3 of the present invention.

FIG. 5 is a schematic structural view of an energy-saving plate according to Embodiment 3 of the present invention. As shown in FIG. 5, regarding as a variable structure of the embodiment shown in FIG. 1, the energy-saving plate 04 of the present embodiment also consists of three plate layers. The upper plate and the lower plate at the outermost layer are air toughened glass plates 51 with a thickness of 6 mm (produced by CLFG). The lateral edges of the two air toughened glass plates 51 appear as an integral straight line. The inner plate is a Gorilla glass plate 53 with a thickness of 2 mm, which is produced by Corning Company of USA. A groove 511 is carved on the inner lateral edge of the outermost lower air toughened CLFG glass with a thickness of 6 mm, and on the inner lateral edge of the outmost upper air toughened CLFG glass with a thickness of 6 mm, locating near the exhausting pipe 57. Patterns are carved or printed on the inner plate 53.

A plurality of support structures 54 are placed, in sequence, on the outermost lower air toughened glass plates 51 with a thickness of 6 mm (produced by CLFG), and on the Gorilla glass plate 53 with a thickness of 2 mm, which is produced by Corning Company of USA. A plurality of support structures 54 are arranged perpendicularly between the outermost lower air toughened glass plates 51 with a thickness of 6 mm (produced by CLFG), and the Gorilla glass plate 53 with a thickness of 2 mm, which is produced by Corning Company of USA, and are arranged perpendicularly between the inner Gorilla glass plate 53 with a thickness of 2 mm, which is produced by Corning Company of USA, and the outermost upper air toughened glass plates 51 with a thickness of 6 mm (produced by CLFG), and are arranged alternatively in a direction perpendicular to the plate, which direction does not appear as an identical straight line. The lateral side of the inner Gorilla glass plate 53 with a thickness of 2 mm is provided with an exhausting opening 56, which is a through-groove inter-penetrating the upper and lower surface of the inner Gorilla glass plate 53 with a thickness of 2 mm. The exhausting opening 56 recesses towards the inner side of the inner Gorilla glass plate 53 with a thickness of 2 mm to form an arc 561. An exhausting pipe 57 is arranged in the exhausting opening 56, enabling the exhausting pipe 57 connect to the space between the plates.

A sealing material 55 is placed, in sequence, on the upper surface periphery of the outermost lower air toughened glass plates 51 with a thickness of 6 mm (produced by CLFG), and on the inner Gorilla glass plate 53 with a thickness of 2 mm, which is produced by Corning Company of USA. The outermost upper air toughened glass plates 51 with a thickness of 6 mm (produced by CLFG), is covered on, and the sealing material 55 is melted at a temperature of equal to or less than 500° C., so as to seal these three layer plates together. The space between plates is vacuumized via the exhausting pipe 57, enables the vacuum level keep within a range of 10 Pa to $10^{-6}$ Pa. A heating coil is winded around the outside of the exhausting pipe 57, while locally heating the exhausting pipe 57 by supplying electricity, cooling the bottom of the exhausting pipe 57 with high pressure cold air, thus the exhausting pipe 57 is sealed, enables the closed-end of the exhausting pipe to locate in the space formed between the outermost lower air toughened glass plates 51 with a thickness of 6 mm (produced by CLFG), and the outermost upper air toughened glass plates 51 with a thickness of 6 mm (produced by CLFG). Thus, the energy-saving plate 05 is formed.

Figure 6:
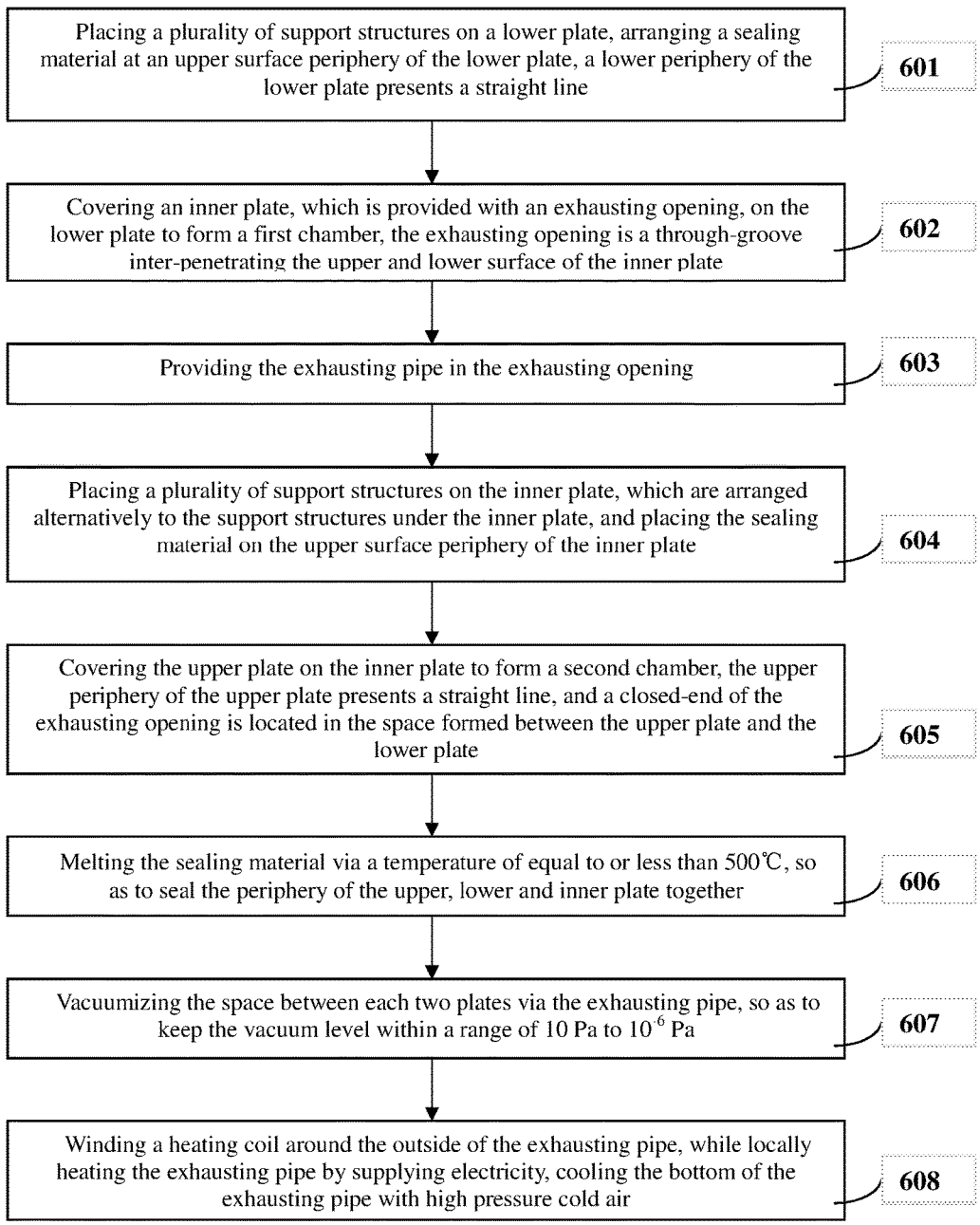
FIG. 6 is a flow chart of a first embodiment of a method for manufacturing the energy-saving plate of the present invention.

FIG. 6 is a flow chart of a first embodiment of a method for manufacturing the energy-saving plate of the present invention. As shown in FIG. 6, the method for manufacturing the energy-saving plate in this embodiment includes:

Step 601, placing a plurality of support structures on a lower plate, arranging a sealing material at an upper surface periphery of the lower plate. Lower periphery of the lower plate appears as a straight line.

Step 602, covering an inner plate, which is provided with an exhausting opening, on the lower plate to form a first chamber. The exhausting opening is a through-groove inter-penetrating upper and lower surfaces of the inner plate.

Step 603, providing the exhausting pipe in the exhausting opening.

Step 604, placing a plurality of support structures on the inner plate, which are arranged alternatively to the support structures under the inner plate, and placing the sealing material on the upper surface periphery of the inner plate.

Step 605, covering the upper plate on the inner plate to form a second chamber. The upper periphery of the upper plate appears as a straight line, and a closed-end of the exhausting opening is located in the space formed between the upper plate and the lower plate.

Step 606, melting the sealing material via a temperature of equal to or less than 500° C. so as to seal the periphery of the upper, lower and inner plate together.

Step 607, vacuumizing the space between each two plates via the exhausting pipe, enables the vacuum level to keep within a range of 10 Pa to $10^{-6}$ Pa.

Step 608, winding a heating coil around the outside of the exhausting pipe, while locally heating the exhausting pipe by supplying electricity, cooling the bottom of the exhausting pipe with high pressure cold air.

It should be noted that, manufacturing an energy-saving plate with only three layer plates is illustrated in the present embodiment, however, the present invention is not limited to three layer plates, three layer plates or more than three layer plates can also be adopted to manufacture the energy-saving plate. The manufacture principle is similar to the process of this embodiment, which will not be repeated here.

The method for manufacturing energy-saving plate provided in the embodiment of the present invention has solved the problems including: difficult machining of half groove on the plate, and easy cracking of the plate, through providing an exhausting opening, which is a through-groove inter-penetrating the upper and lower surface of the inner plate, at a lateral side of the inner plate. That is, forming a "凵" shaped through-groove at the lateral side of the inner plate. Furthermore, arranging the exhausting pipe in the exhausting opening, enables the open-end of the exhausting pipe to connect to the vacuum layer through the through-groove. The vacuum layer is vacuumized via the exhausting pipe, enables the vacuum level keep within a range of 10 Pa to $10^{-6}$ Pa. A heating coil is winded around the outside of the exhausting pipe, while locally heating the exhausting pipe by supplying electricity, cooling the bottom of the exhausting pipe with high pressure cold air, thus the exhausting pipe is sealed, enables the closed-end of the exhausting pipe to locate outside of the exhausting opening and locate in the space formed between the upper plate and the lower plate of the energy-saving plate. Thus, the lateral edge of the upper plate and the lower plate can be an integral straight line, and the closed-end of the exhausting pipe is located in the interior of the periphery of the energy-saving plate. It is not needed to provide an accommodating recess on the upper plate and the lower plate, for receiving the exhausting pipe, it is not needed to provide a metal protecting lid for covering the exhausting pipe, and it is not needed to worry about the problem of cracking of the exhausting pipe. In addition, a total flat surface of the energy-saving plate is achieved without structure defects, thus enhancing the strength of the energy-saving plate.

Finally, it should be noted that the above embodiments are merely provided for describing the technical solutions of the present invention, but not intend to limit the present invention. Although the present invention has been described in detail with reference to the foregoing embodiments, it should be understood by those of ordinary skill in the art that modifications can be made to the technical solutions described in the foregoing embodiments, or equivalent replacements can be made to some technical features in the technical solutions; such modifications or replacements do not cause the essence of corresponding technical solutions to depart from the scope of the present invention.

What is claimed is:

1. A panel comprising:
   a first plate comprising glass;
   a second plate comprising glass;
   a third plate between the first and second plates, the third plate comprising a flexible material;
   a first plurality of support structures sandwiched between the first plate and the third plate;
   a second plurality of support structures sandwiched between the second plate and the third plate, wherein peripheries of the first, second and third plates are aligned and sealed to form a first vacuum chamber between the first and third plates and a second vacuum chamber between the second and third plates,
   the third plate comprises a notch at an edge of the third plate and formed between the first plate and the second plate, the notch providing a fluid channel connecting the first and second vacuum chambers such that the first and second vacuum chambers are in fluid communication and under a same vacuum pressure, the second plurality of support structures are off-set from the first plurality of support structures such that the support structures and the third plate form non-linear thermal pathways from the first plate to the second plate, and a pumping pipe enclosed within the notch and between the first plate and the second plate, the pumping pipe having an open end in fluid communication with the fluid channel and a terminal closed end, wherein the first and second plates have straight peripheral edges.

2. The panel of claim 1, wherein the notch is U-shaped.

3. The panel of claim 1, wherein the peripheries of the plates are sealed with a sealing material.

4. The panel of claim 1, wherein each one of the plates has a flatness of larger than 10 nm/m.

5. The panel of claim 1, wherein the third plate comprises a central plate body and a frame around the central body, and a portion of the fluid channel is formed between the central plate body and the frame.

6. The panel of claim 5, wherein the frame is generally C-shaped.

7. The panel of claim 1, wherein at least one of the first and second plates comprises a groove or recess on an inner side of the at least one plate aligned with the fluid channel.

8. The panel of claim 1, further comprising a getter in the fluid channel.

9. The panel of claim 1, wherein the vacuum pressure is $10^{-6}$ Pa to 10 Pa.

10. The panel of claim 1, wherein the panel is a glass panel.

11. The panel of claim 1, wherein the third plate is deformable to increase the uniformity of the forces distributed to the support structures through the third plate.

12. The panel of claim 3, wherein the fluid channel is sealed by the sealing material and the pumping pipe sealingly extends through the sealing material.

* * * * *